3,534,015
POLYMERIZATION WITH SILVER CATALYST
Edwin F. Peters, Lansing, Ill., assignor to Standard Oil Company, Chicago, Ill., a corporation of Indiana
No Drawing. Filed May 9, 1967, Ser. No. 637,067
Int. Cl. C08f 1/66, 3/06
U.S. Cl. 260—94.9     6 Claims

ABSTRACT OF THE DISCLOSURE

A novel catalyst for the polymerization of unsaturated organic compounds is finely-divided silver used in conjunction with an organo-aluminum compound.

---

My invention relates to a novel catalyst and a novel process using such catalyst for the polymerization of unsaturated organic compound. Specifically, my invention relates to polymerization catalyst which comprises finely-divided silver in conjunction with an aluminum hydrocarbon compound. I have found that silver, which is catalytically inactive in the form of silver films or particles having a size sufficiently large to show a silver color, when subdivided into a black form and used in conjunction with an aluminum hydrocarbon promoter has catalytic activity for the polymerization of ethylenically unsaturated hydrocarbons and acetylenic hydrocarbons and mixtures thereof.

Various methods may be used to subdivide the silver, such as those used to prepare Raney nickel and cobalt as well as electrolysis using an alternating current. One of the simplest methods is to suspend a copper wire tree in a solution of silver nitrate. The silver nitrate undergoes a reducing reaction and there is formed a spongy gelatinous mass upon the copper, which contains finely-divided silver. The silver sponge can be washed free of water with alcohol and dried in an inert atmosphere to yield a catalytically active finely-divided silver.

The organoaluminum compounds suitable as promoters in my novel catalyst composition are those conforming to the general formula:

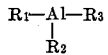

wherein $R_1$, $R_2$ and $R_3$ may be the same or different monovalent radicals selected from the class consisting of hydrogen and monovalent hydrocarbon radicals. Examples of suitable R groups include an aryl radical, aliphatic hydrocarbon radicals or derivatives, such as alkyl, cycloalkyl-alkyl, cycloalkenyl-alkyl, aryl-alkyl, cycloalkyl and the like. Specific examples of R groups for substitution in the above formula include methyl, ethyl, n-propyl, isopropyl, isobutyl, n-amyl, isoamyl and the like which are well known to this art.

The proportion of organoaluminum co-catalysts to be used with the finely-divided silver can range from about 0.01 to 20 weight percent or more, based on the weight of the polymerizable feed material. It is usually employed in proportions between about 0.1 and about 10 weight percent. The weight ratio of finely-divided silver to polymerizable monomer can generally be varied in the range of about 0.01 to about 10 percent by weight though greater amounts are also effective.

Polymerization can be effected with my novel catalyst at temperatures which vary in accordance with the polymerization activity of the specific monomer or co-monomers and promoters. Desirable polymerization temperatures generally fall within the range of about −80° C. to about 400° C., more often from 0° C. to about 350° C., and preferably from about 25° C. to about 300° C.

Polymerization can be carried out in the gas phase or in liquefied monomer but it is often desirable to effect polymerization in the presence of a substantially inert reaction medium which functions as a partial solvent for the monomer, which may function as a liquid transport medium to remove solid polymerization product as a dispersion in a continuous process.

Particularly suitable liquid reaction media are various groups of hydrocarbons or their mixtures which are liquid or substantially inert under the polymerization conditions of my process. Certain classes of aliphatic hydrocarbons can be employed as reaction media such as the various saturated alkanes and cycloalkanes. Specifically, I may use such liquid or liquefied alkanes as propanes, butanes, n-pentane, n-hexane, Decalin and the like.

The feed for polymerization in accordance with my invention can be any polymerizable 1-alkenes or 1-alkynes. It is particularly useful with the 1-olefins, diolefins having terminal unsaturation and terminal acetylenes. Suitable 1-olefins have the general formula $RCH=CH_2$ wherein R is hydrogen or a saturated monovalent hydrocarbon radical, for example, alkyl, cycloalkyl, aryl, alkyl-aryl and the like. Specific suitable feed stocks are such compounds as ethylene, propylene, 1-butene, 1-pentene, butadiene, isoprene, acetylene, propyne, 1-butyne and the like.

It should be understood that mixtures of the specific monomers can be polymerized and that the various monomers are not equivalents for the purpose of my invention. Vastly different polymer products can be obtained by varying the feed stocks.

The polymerization carried out with my catalyst is preferably effected in the absence of impurities which tend to act as catalyst poisons, as by reacting with and consuming the catalyst or the components of the catalytic mixture, such impurities being generally known to the art and including oxygen, carbon dioxide, water and the like.

In order to provide the worker in this art with a better understanding of the nature of my novel polymerization catalyst and the practice of my novel process, the following descriptions of examples are set forth.

A copper tree was prepared from a sheet of copper 4″ x 6″ x 6 mm. thickness by cutting the sheet from both edges almost to the middle in ¼-inch strips along the long edge. The ¼-inch strips were then bent and spaced from each other so that the sheet had the general appearance of a tree. Into a one-gallon jug there was placed 3.5 liter of distilled water and 42.5 g. (0.25 m.) silver nitrate crystals. These were dissolved by stirring and the copper tree was suspended in the solution by means of a polyethylene string. The copper tree hung in the solution for about 48 hours during which time a fine silver deposit formed about the copper. This ranged in appearance from black through gray to colorless. The silver deposit was then shaken off the tree and the tree removed. The silver was allowed to settle and the bulk of the solution was decanted, following which the settled silver slurry was charged into a 250 ml. Erlenmeyer flask where it was washed repeatedly with distilled water. The distilled water was then displaced by two washes with 200 ml. each of C.P. acetone. After removal of the second portion of acetone, the silver was dried in a vacuum oven whereupon there was obtained black, finely-divided silver.

A 2.0 g. sample of the above prepared silver was added to 200 ml. of n-heptane in a rocking bomb reactor. To this was added 0.40 g. of aluminum triisobutyl and the bomb was charged to 600 p.s.i.g. with ethylene. The mixture was allowed to stand for 12 hours at 25° C. and then warmed over a period of 8 hours to a temperature of 88° C., all with rocking. From the reaction mixture there was recovered 2.34 g. of solid polyethylene containing the 2.0 g. of silver catalyst. This solid could be compression-molded into a polyethylene film. On molding, the formerly black silver returns to a silver metal appearance so that one obtains a plastic silver mirror.

The silver can be removed from the aforedescribed plastic silver mirror by nitric acid leaching or other recovery technique, and there is thus obtained a polyethylene which has the characteristic properties and infrared spectrum of high density polyethylene.

In another experiment, about 1 g. of finely-divided silver was used with 0.20 g. of aluminum triisobutyl in 100 ml. n-heptane to polymerize ethylene at 25° C. under 300 p.s.i.g. ethylene pressure. There was obtained about 1 g. of solid polyethylene.

Having thus described my invention, what I claim is:

1. A polymerization catalyst which consists essentially of finely-divided black silver and an organoaluminum compound conforming to the general formula $AlR_3$ wherein R may be the same or different monovalent radicals selected from the class consisting of hydrogen and monovalent hydrocarbon radicals, each being present in at least a catalytically effective amount.

2. The catalyst of claim 1 wherein the organoaluminum compound is an aluminum trihydrocarbon compound and the weight ratio of said aluminum trihydrocarbon compound to said finely-divided black silver is at least about 1:100.

3. The catalyst of claim 2 wherein said aluminum trihydrocarbon compound is aluminum triisobutyl.

4. A process for polymerizing 1-alkenes and 1-alkynes using the catalyst of claim 1.

5. The process for polymerizing 1-olefins using the catalyst of claim 2.

6. The process for polymerizing ethylene using the catalyst of claim 3.

References Cited

UNITED STATES PATENTS 2,871,276   1/1959   Eiszner _____ 260—683.15

JOSEPH L. SCHOFER, Primary Examiner

E. J. SMITH, Assistant Examiner

U.S. Cl. X.R.

252—430; 260—88.2, 93.7, 94.1, 94.3